United States Patent
Sarli et al.

(10) Patent No.: US 10,521,540 B2
(45) Date of Patent: Dec. 31, 2019

(54) SYSTEM AND METHOD FOR INTERACTIVE DATASHEETS

(71) Applicant: TEXAS INSTRUMENTS INCORPORATED, Dallas, TX (US)

(72) Inventors: Christopher William Sarli, Dallas, TX (US); Andrew George Dykstra, Allen, TX (US); Todd Ashley Breeding, Meadows Place, TX (US); Makram Mounzer Mansour, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 114 days.

(21) Appl. No.: 15/844,916

(22) Filed: Dec. 18, 2017

(65) Prior Publication Data
US 2019/0188350 A1    Jun. 20, 2019

(51) Int. Cl.
*G06F 17/50* (2006.01)
*G06F 17/22* (2006.01)

(52) U.S. Cl.
CPC ...... *G06F 17/5068* (2013.01); *G06F 17/2247* (2013.01); *G06F 17/2288* (2013.01); *G06F 17/5022* (2013.01)

(58) Field of Classification Search
CPC ............. G06F 17/5068; G06F 17/2247; G06F 17/2288; G06F 17/5022
USPC ........................................ 716/100, 101, 102
See application file for complete search history.

(56) References Cited

U.S. PATENT DOCUMENTS

| | | | |
|---|---|---|---|
| 6,484,182 B1 * | 11/2002 | Dunphy et al. | G06Q 10/06 707/999.102 |
| 6,530,065 B1 | 3/2003 | McDonald et al. | |
| 6,678,877 B1 | 1/2004 | Perry et al. | |
| 6,687,710 B1 * | 2/2004 | Dey | G06F 17/5045 705/36 R |
| 6,832,182 B1 | 12/2004 | Wilson, Jr. | |
| 6,877,033 B1 | 4/2005 | Garrett et al. | |
| 6,931,369 B1 | 8/2005 | Perry et al. | |
| 6,966,039 B1 * | 11/2005 | Bartz et al. | G06F 8/30 716/121 |
| 7,613,599 B2 * | 11/2009 | Bade et al. | G06F 17/5022 703/14 |
| 7,822,590 B2 * | 10/2010 | Kundert | G01R 31/318357 345/581 |

(Continued)

*Primary Examiner* — Sun J Lin
(74) *Attorney, Agent, or Firm* — Michelle F. Murray; Charles A. Brill; Frank D. Cimino

(57) ABSTRACT

A method includes retrieving an interactive datasheet for a product and displaying, on an output device, a first view of the interactive datasheet for the product, the interactive datasheet including a first section and a second section. The method also includes adjusting, in response to receiving, by an input device of a computing device from a user, a first value of a characteristic of the product, to produce a first adjusted characteristic, and updating a model of the product, based on the first value of the characteristic of the product, to produce an updated interactive datasheet for the product. Additionally, the method includes updating the first view of the interactive datasheet for the product displayed on the output device, the first view, based on the updated interactive datasheet for the product and storing, in the memory, the updated interactive datasheet for the product, in response to receiving an indication by the user.

20 Claims, 21 Drawing Sheets

(56) References Cited

U.S. PATENT DOCUMENTS

| | | | |
|---|---|---|---|
| 8,224,636 B2* | 7/2012 | Kundert | G01R 31/318357 |
| | | | 703/13 |
| 8,332,789 B2 | 12/2012 | Perry et al. | |
| 8,712,741 B2 | 4/2014 | Perry et al. | |
| 9,038,004 B2* | 5/2015 | Ford et al. | G06F 17/5045 |
| | | | 716/102 |
| 9,087,164 B2 | 7/2015 | Perry et al. | |
| 9,348,619 B1* | 5/2016 | Lysaght et al. | G06F 17/5027 |
| 2002/0122060 A1* | 9/2002 | Markel | G06F 17/2247 |
| | | | 715/760 |
| 2004/0034658 A1* | 2/2004 | Potter et al. | G01D 3/022 |
| 2004/0243374 A1* | 12/2004 | Kundert | G01R 31/318357 |
| | | | 703/14 |
| 2014/0279253 A1* | 9/2014 | Nizam et al. | G06Q 30/06 |
| | | | 705/26.62 |

* cited by examiner

FIG. 6A
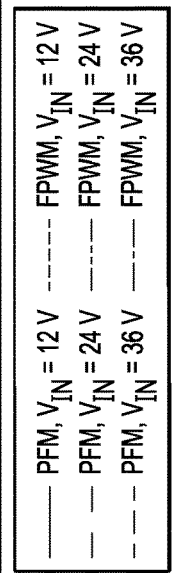
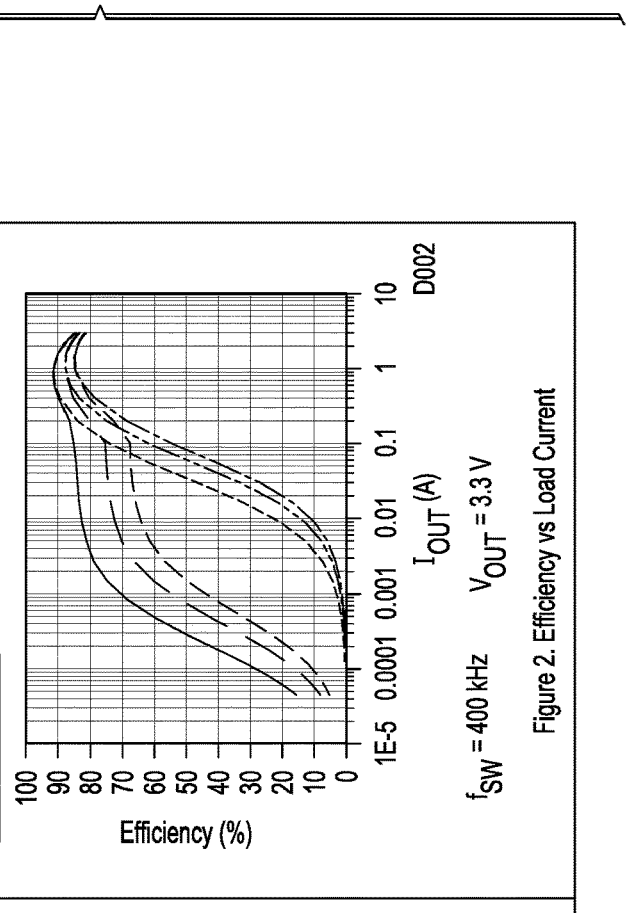
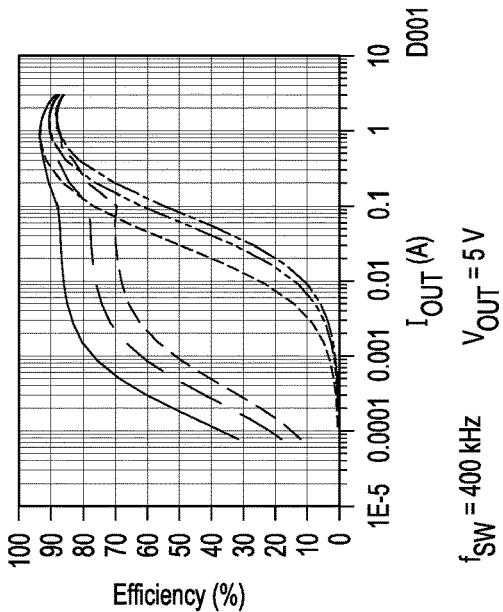

FIG. 6B
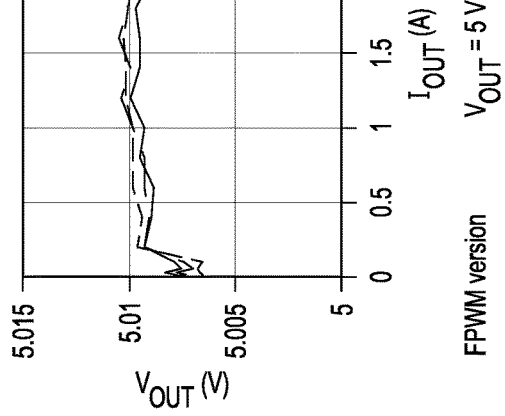
310 Go to Application and Implementation
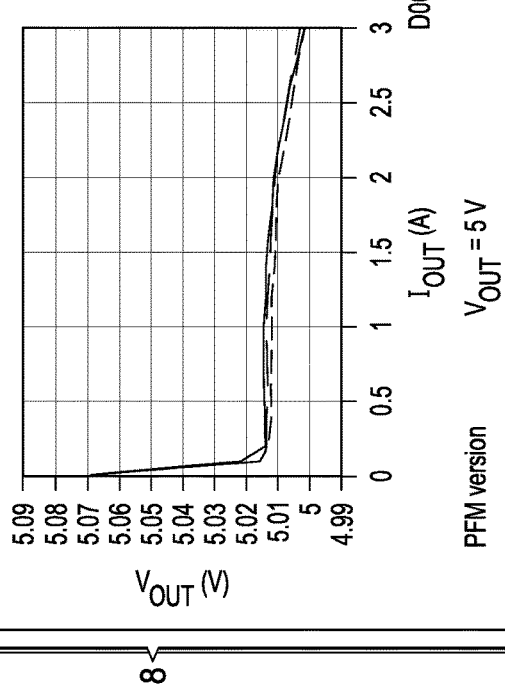

FIG. 6C
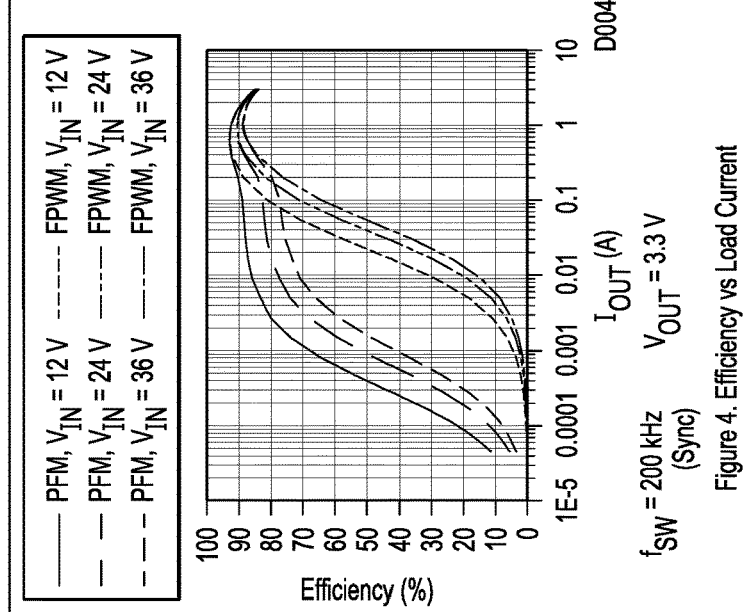
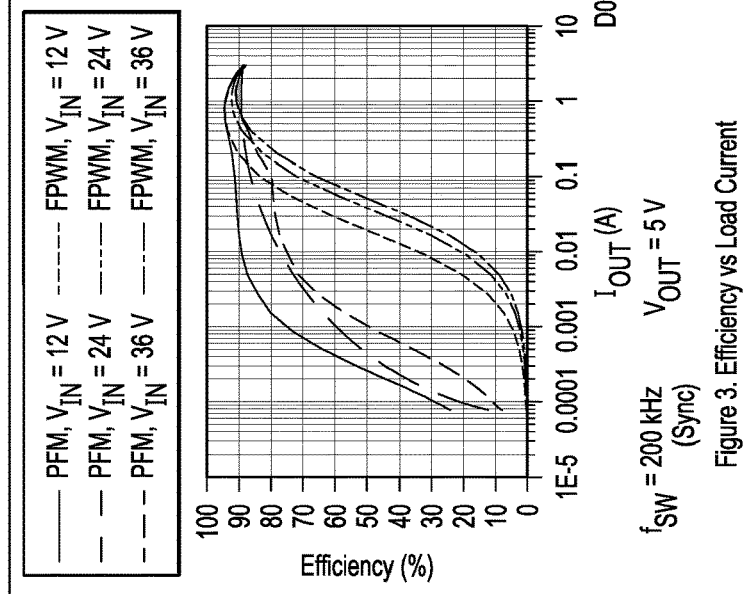

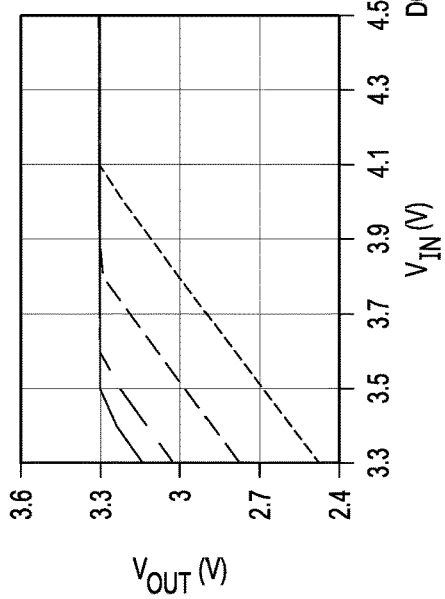
Figure 7. Dropout Curve
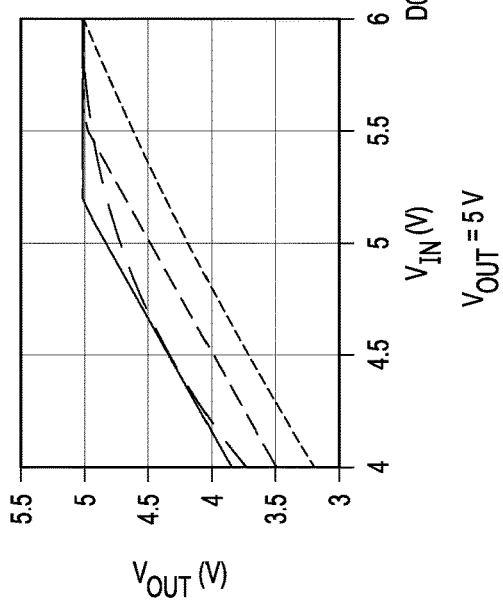
Figure 8. Dropout Curve

FIG. 6E

4 Ratings and Electrical Characteristics
7.1 Absolute Maximum Ratings
Over the recommended operating junction temperature range of –40°C to +125°C (unless otherwise noted)[1]

| | PARAMETER | MIN | MAX | UNIT |
|---|---|---|---|---|
| Input voltages | VIN to PGND | -0.3 | 42 | V |
| | EN/SYNC to AGND | -5.5 | $V_{IN}$ + 0.3 | |
| | FB to AGND | -0.3 | 4.5 | |
| | RT to AGND | -0.3 | 4.5 | |
| | PGOOD to AGND | -0.3 | 15 | |
| | AGND to PGND | -0.3 | 0.3 | |
| Output voltages | SW to PGND | -1 | $V_{IN}$ + 0.3 | V |
| | SW to PGND less than 10 ns transients | -5 | 42 | |
| | BOOT to SW | -0.3 | 5.5 | |
| | VCC to AGND | -0.3 | 4.5[2] | |
| $T_J$ | Junction temperature | -40 | 150 | °C |
| $T_{stg}$ | Storage temperature | -65 | 150 | °C |

(1) Stresses beyond those listed under Absolute Maximum Ratings may cause permanent damage to the device. These are stress ratings only, which do not imply functional operation of the device at these or any other conditions beyond those indicated under Recommended Operating Conditions. Exposure to absolute-maximum-rated conditions for extended periods may affect device reliability.
(2) In shutdown mode, the VCC to AGND maximum value is 5.25 V.

FIG. 6F

7.5 Electrical Characteristics

Limits apply over the recommended operating junction temperature ($T_J$) range of –40°C to +125°C, unless otherwise stated. Minimum and maximum limits are specified through test, design or statistical correlation. Typical values represent the most likely parametric norm at $T_J$ = 25 °C, and are provided for reference purposes only.

Go to Functions Block Diagram

| PARAMETER | | TEST CONDITIONS | MIN | TYP | MAX | UNIT |
|---|---|---|---|---|---|---|
| POWER SUPPLY (VIN PIN) | | | | | | |
| $V_{IN}$ | Operation input voltage | HSOIC package | 4.5 | | 36 | V |
| | | WSON package | 4 | | 36 | V |
| VIN_UVLO | Undervoltage lockout thresholds | Rising threshold (HSOIC) | 3.4 | 3.7 | 3.9 | V |
| | | Falling hysteresis (HSOIC) | | 0.4 | | |
| | | Rising threshold (WSON) | 3.3 | 3.6 | 3.9 | V |
| | | Falling threshold (WSON) | 3 | 3.3 | 3.5 | V |
| $I_{SHDN}$ | Shutdown supply current | $V_{EN}$ = 0 V, $V_{IN}$ = 4.5 V to 36 V, $T_J$ = –40°C to 125°C (HSOIC) | | 2 | 4 | μA |
| | | $V_{EN}$ = 0 V, $V_{IN}$ = 12 V, $T_J$ = –40°C to 125°C (WSON) | | | | |
| $I_Q$ | Operating quiescent current (non-switching) | $V_{IN}$ = 12 V, $V_{FB}$ = 1.1 V, $T_J$ = –40°C to125°C, PFM mode | | 75 | | μA |
| ENABLE (EN PIN) | | | | | | |
| $V_{EN\_H}$ | Enable rising threshold voltage | | 1.4 | 1.55 | 1.7 | V |
| $V_{EN\_HYS}$ | Enable hysteresis voltage | | | 0.4 | | V |
| $V_{WAKE}$ | Wake-up threshold | | 0.4 | | | V |

FIG. 6G

7.2 ESD Ratings

| | | VALUE | UNIT |
|---|---|---|---|
| V(ESD) | Electrostatic discharge | | V |
| | Human-body model (HBM) for HSOIC and WSON package [1] | ±2500 | |
| | Charged-device model (CDM) for HSOIC and WSON RT [2] | ±1000 | |
| | Charged-device model (CDM) for WSON PGOOD [2] | ±750 | |

(1) JEDEC document JEP155 states that 500-V HBM allows safe manufacturing with a standard ESD control process.
(2) JEDEC document JEP157 states that 250-V CDM allows safe manufacturing with a standard ESD control process.

7.3 Recommended Operating Conditions

Over the recommended operating junction temperature range of −40°C to +125°C (unless otherwise noted) [1]

| | PARAMETER | MIN | MAX | UNIT |
|---|---|---|---|---|
| Input voltage | VIN (HSOIC) | 4.5 | 36 | V |
| | VIN (WSON) | 4 | 36 | |
| | EN/SYNC | −5 | 36 | |
| | FB | −0.3 | 1.2 | |
| | PGOOD | −0.3 | 12 | |
| Input current | PGOOD pin current | 0 | 1 | mA |
| Output voltage | V$_{OUT}$ | 1 | 28 | V |
| Output current | I$_{OUT}$ | 0 | 2.5 | A |
| Temperature | Operating junction temperature, T$_J$ | −40 | 125 | °C |

(1) Operating Ratings indicate conditions for which the device is intended to be functional, but do not ensure specific performance limits. For ensured specifications, see Electrical Characteristics.

FIG. 6H

FROM FIG. 6F

| | | | | | | |
|---|---|---|---|---|---|---|
| $I_{EN}$ | Input leakage current at EN pin | $V_{IN}$ = 4.5 V to 36 V, $V_{EN}$ = 2 V (HSOIC) | | 10 | | nA |
| | | $V_{IN}$ = 4 V to 36 V, $V_{EN}$ = 2 V (WSON) | | | 100 | nA |
| | | $V_{IN}$ = 4.5 V to 36 V, $V_{EN}$ = 36 V (HSOIC) | | | 1 | μA |
| | | $V_{IN}$ = 4 V to 36 V, $V_{EN}$ = 36 V (WSON) | | | 1 | μA |
| VOLTAGE REFERENCE (FB PIN) | | | | | | |
| $V_{REF}$ | Reference voltage | $V_{IN}$ = 4.5 V to 36 V, $T_J$ = 25 °C (HSOIC) | 0.985 | 1 | 1.015 | V |
| | | $V_{IN}$ = 4.0 V to 36 V, $T_J$ = 25 °C (WSON) | | | | |
| | | $V_{IN}$ = 4.5 V to 36 V, $T_J$ = −40°C to 125°C (HSOIC) | 0.98 | 1 | 1.02 | V |
| | | $V_{IN}$ = 4.0 V to 36 V, $T_J$ = −40°C to 125°C (HSOIC) | | | | |
| $I_{LKG\_FB}$ | Input leakage current at FB pin | $V_{FB}$ = 1 V | | 10 | | nA |
| POWER GOOD (PGOOD PIN) | | | | | | |
| $V_{PG\_OV}$ | Power-good flag overvoltage tripping threshold | % of reference voltage | 104% | 107% | 110% | |
| $V_{PG\_UV}$ | Power-good flag undervoltage tripping threshold | % of reference voltage | 92% | 94% | 96.5% | |
| $V_{PG\_HYS}$ | Power-good flag recover hystersis | % of reference voltage | | 1.5% | | |
| $V_{IN\_PG\_MIN}$ | Minimum $V_{IN}$ for valid PGOOD output | 50 μA pullup to PGOOD pin, $V_{EN}$ = 0 V, $T_J$ = 25°C | | | 1.5 | V |
| $V_{PG\_LOW}$ | PGOOD low level output voltage | 50 μA pullup to PGOOD pin, $V_{IN}$ = 1.5 V, $V_{EN}$ = 0 V | | | 0.4 | V |
| | | 0.5 mA pullup to PGOOD pin, $V_{IN}$ = 13.5 V, $V_{EN}$ = 0 V | | | 0.4 | V |

TO FIG. 6J

FROM FIG. 6G

FIG. 6I

7.3 Thermal Information

| THERMAL METRIC [1] [2] | | DDR (8 PINS) | DDR (12 PINS) | UNIT |
|---|---|---|---|---|
| $R_{\theta JA}$ | Junction-to-ambient thermal resistance | 42.0 | 41.5 | °C/W |
| $R_{JT}$ | Junction-to-top characterization parameter | 5.9 | 0.3 | °C/W |
| $R_{JB}$ | Junction-to-board characterization parameter | 23.4 | 16.5 | °C/W |
| $R_{\theta JC(top)}$ | Junction-to-case (top) thermal resistance | 45.8 | 39.1 | °C/W |
| $R_{\theta JC(bot)}$ | Junction-to-case (bottom) thermal resistance | 3.6 | 3.4 | °C/W |
| $R_{\theta JB}$ | Junction-to-board thermal resistance | 23.4 | 16.3 | °C/W |

(1) For more information about traditional and new thermal metrics, see the *Semiconductor and IC Package Thermal Metrics* application report.
(2) Determine power rating at a specific ambient temperature TA with a maximum junction temperature ($T_J$) of 125°C (see *Recommended Operating Conditions*).

An IMPORTANT NOTICE at the end of this data sheet addresses availability, warranty, changes, use in safety-critical applications, intellectual property matters and other important disclaimers. PRODUCTION DATA. Click the balance symbol to the left to view.

FROM FIG. 6G

| INTERNAL LDO (VCC PIN) | | | | | | |
|---|---|---|---|---|---|---|
| $V_{CC}$ | Internal LDO output voltage | | | 4.1 | | V |
| VCC_UVLO | VCC undervoltage lockout thresholds | Rising threshold | 2.8 | 3.2 | 3.6 | V |
| | | Falling threshold | 2.4 | 2.8 | 3.2 | V |
| CURRENT LIMIT | | | | | | |
| $I_{HS\_LIMIT}$ | Peak inductor current limit | HSOIC package | 3.8 | 5 | 6.2 | A |
| | | WSON package | 4 | 5.5 | 6.6 | A |
| $I_{LS\_LIMIT}$ | Valley inductor current limit | HSOIC package | 2.9 | 3.6 | 4.6 | A |
| | | WSON package | 2.9 | 3.6 | 4.2 | A |
| $I_{L\_ZC}$ | Zero cross current limit | HSOIC and WSON package | | -0.04 | | A |
| $I_{L\_NEG}$ | Negative current limit (FPWM option) | SOIC and WSON package | -2.7 | -2 | 1.3 | A |
| INTEGRATED MOSFETS | | | | | | |
| $R_{DS\_ON\_HS}$ | High-side MOSFET ON-resistance | SOIC package, $V_{IN}$ = 12 V, $I_{OUT}$ = 1 A | | 185 | | mΩ |
| | | WSON package, $V_{IN}$ = 12 V, $I_{OUT}$ = 1 A | | 160 | | mΩ |
| $R_{DS\_ON\_LS}$ | Low-side MOSFET ON-resistance | SOIC package, $V_{IN}$ = 12 V, $I_{OUT}$ = 1 A | | 105 | | mΩ |
| | | WSON package, $V_{IN}$ = 12 V, $I_{OUT}$ = 1 A | | 95 | | mΩ |
| THERMAL SHUTDOWN | | | | | | |
| $T_{SHDN}$ | Thermal shutdown threshold | | 1.62 | 170 | 1.78 | °C |
| $T_{HYS}$ | Hysteresis | | | 15 | | °C |

FROM FIG. 6H
TO FIG. 6I www.ti.com

FIG. 8A

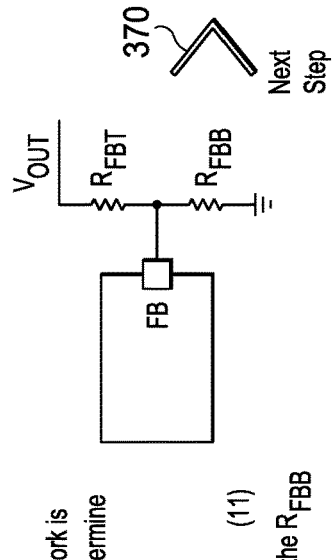

LMR23630 — 244

36-V, 3A Synchronous Step-Down Converter

7 Application and Implementation
Follow the procedure below to select component values

*Output Voltage Setpoint*

The output voltage of LMR23630 is externally adjustable using a resistor divider network. The divider network is comprised of top feedback resistor $R_{FBT}$ and bottom feedback resistor $R_{FBB}$. Equation 11 is used to determine the output voltage:

$$R_{FBT} = \frac{V_{OUT} - V_{REF}}{V_{REF}} \times R_{FBB} \qquad (11)$$

Choose the value of $R_{FBB}$ to be 22.1 kΩ. With the desired output voltage set to 5 V and the $V_{REF}$ = 1 V, the $R_{FBB}$ value can then be calculated using Equation 11. The formula yields to a value 88.7 kΩ.

*Enter your values below*

$$40kΩ - \frac{5.00 - 1.00}{1.00} * \boxed{10k}$$

More Info >

Next Step — 370

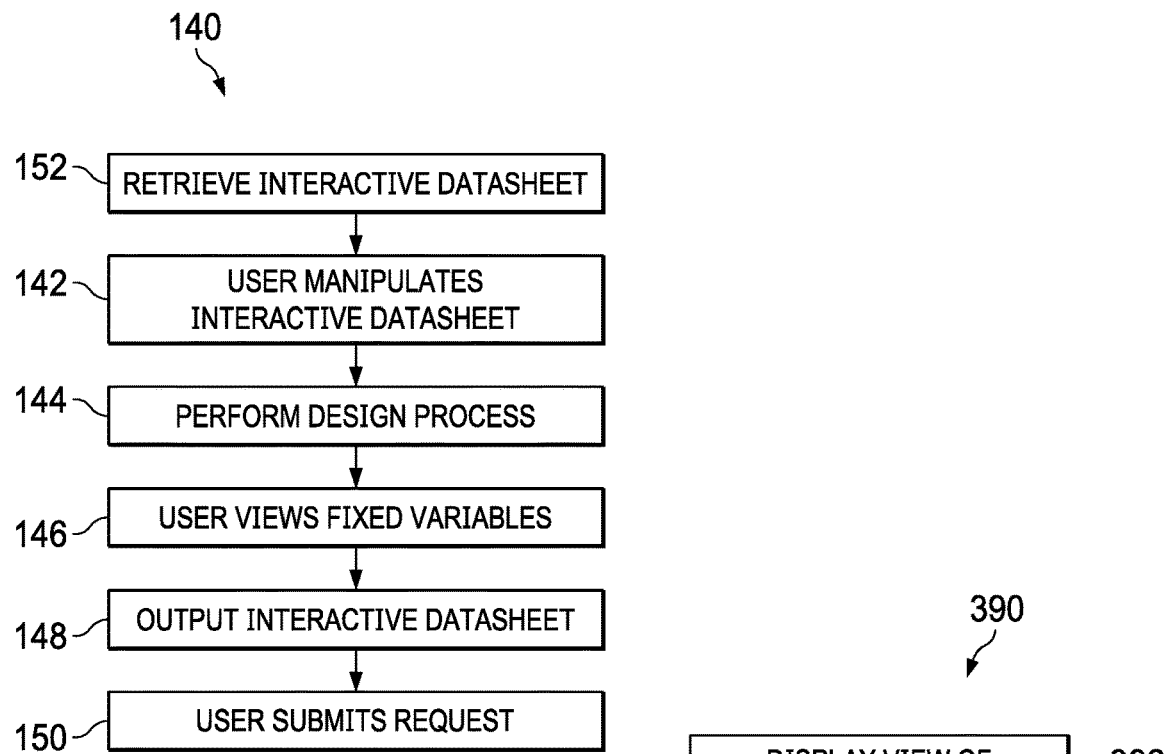
FIG. 11
FIG. 12
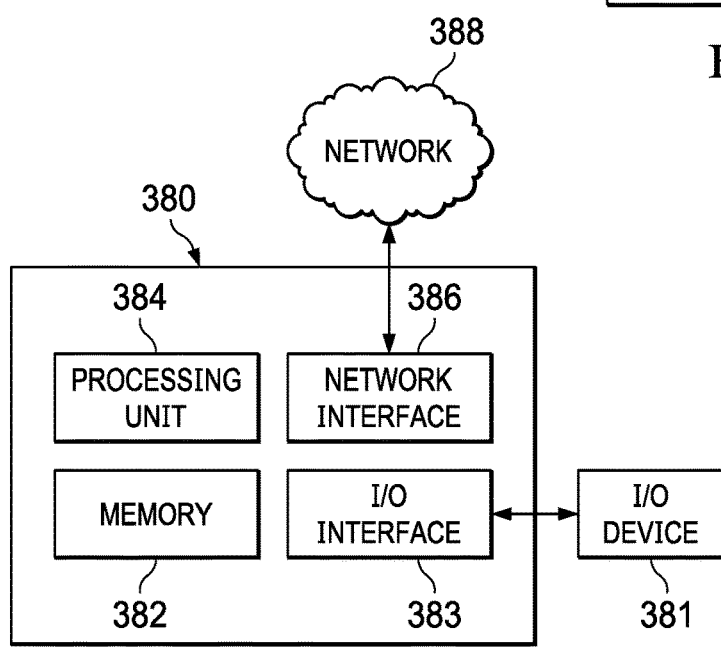
FIG. 14

SYSTEM AND METHOD FOR INTERACTIVE DATASHEETS

FIELD OF THE INVENTION

The present disclosure relates to a system and method for interactive product design, and in particular, to a system and method for interactive datasheets.

BACKGROUND OF THE INVENTION

A datasheet is a document that summarizes the performance and other technical information about a product, machine component, material, subsystem, or software. Datasheets contain information for a design engineer to use the component in a design. Because of the amount of detail, datasheets are often long and unwieldy. A user may spend a significant amount of time sifting through the large amount of information in a datasheet. Also, users might miss key information due to the length and complexity of a datasheet. Datasheets contain average values, typical values, typical ranges, engineering tolerances, or nominal values. However, because a component may have different values in different operating conditions, the values disclosed in a datasheet might not be the values used in a particular design.

SUMMARY OF THE INVENTION

An embodiment method for interactive datasheets includes retrieving, by a processor of a computing device from memory, an interactive datasheet for a product and displaying, on an output device of the computing device, a first view of the interactive datasheet for the product, including a first section and a second section. The method also includes adjusting, by the processor, in response to receiving, by an input device of the computing device from a user, a first value of a characteristic of the product, to produce a first adjusted characteristic and updating, by the processor, a model of the product, based on the first value of the characteristic of the product, to produce an updated interactive datasheet for the product. Additionally, the method includes updating the first view of the interactive datasheet for the product displayed on the output device, the first view, based on the updated interactive datasheet for the product and storing, by the processor in the memory, the updated interactive datasheet for the product, in response to receiving, by the input device, an indication by the user.

An embodiment method for interactive datasheets includes retrieving, by a processor of a computing device from memory, an interactive datasheet for a product. The method also includes displaying, on an output device of the computing device, a first view of the interactive datasheet for the product, including a first section and a second section and transitioning, by a processor of the computing device, from displaying the first view of the interactive datasheet to displaying, on the output device, a second view of the interactive datasheet, in response to receiving, by the input device, an input from the user in the second section of the first view of the interactive datasheet, where the second view of the interactive datasheet includes the first section and a third section. Additionally, the method includes transmitting, by the processor, a request for validation or support, in response to receiving, by the input device, a validation or support indication by the user and receiving, by the processor, a validation or support response, in response to transmitting the request for validation or support. Also, the method includes updating, by the processor, the second interactive datasheet view on the output device, based on the validation or support response.

An embodiment computing device includes an input device and an output device. The computing device also includes a processor coupled to the input device and to the output device and a non-transitory computer readable storage medium storing a program for execution by the processor. The programming includes instructions to retrieve, from memory, an interactive datasheet for a product and display, on the output device, a first view of the interactive datasheet for the product, including a first section and a second section. The programming also includes instructions to adjust, in response to receiving, by the input device from a user, a first value of a characteristic of the product, to produce a first adjusted characteristic and update, a model of the product, based on the first value of the characteristic of the product, to produce an updated interactive datasheet for the product. Additionally, the programming includes instructions to update the first view of the interactive datasheet for the product displayed on the output device, the first view, based on the updated interactive datasheet for the product and store, in the memory, the updated interactive datasheet for the product, in response to receiving, by the input device, an indication by the user.

BRIEF DESCRIPTION OF DRAWINGS

For a more complete understanding of the present disclosure, and the advantages thereof, reference is now made to the following descriptions taken in conjunction with the accompanying drawings, in which:

FIGS. 6A-J illustrate another embodiment display for an interactive datasheet;

FIGS. 8A-B illustrate another embodiment display for an interactive datasheet;

FIG. 11 illustrates a flowchart for an embodiment method of using an interactive datasheet;

FIG. 12 illustrates a flowchart for an embodiment method of designing using an interactive datasheet;

FIG. 14 illustrates a block diagram of an embodiment computing device.

DETAILED DESCRIPTION OF EXAMPLE EMBODIMENTS

Various product lines have offline spreadsheet design calculators that list equations from the corresponding datasheet and calculate components. However, the design calculators are decentralized and contain limited data.

An embodiment interactive datasheet contains integrated calculators for performing live calculations. An embodiment interactive datasheet validates a design in real time. In an embodiment, this feedback may be used by the product line to identify sources of errors during customer debugging and support. The product line may also track system sockets and user specifications for a particular integrated circuit (IC). An embodiment datasheet consolidates all technical information for a product into a single interactive page, where a user can select particular data for viewing. In an embodiment, a user may export a customized datasheet for a particular design, for example as a portable document format (pdf) file. An embodiment interactive datasheet utilizes multiple areas that a user may view simultaneously. In an embodiment, a user saves progress in an interactive datasheet, and re-opens the interactive datasheet at a later time. An embodiment interactive datasheet includes frequently asked part specific questions and corresponding answers, which are updated live, from support forums or from direct product lines. An embodiment personalized datasheet exports application specific design results, for example using a hypertext markup language (HTML) architecture for live computations in the interactive datasheet.

Figure 1:
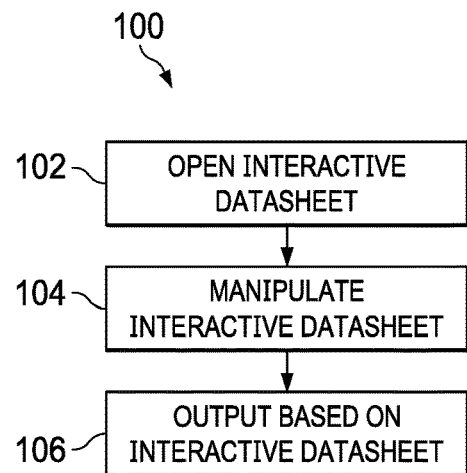
FIG. 1 illustrates a flowchart for an embodiment method for interactive datasheets.

FIG. 1 illustrates the flowchart 100 for an embodiment method of utilizing an interactive datasheet. In the block 102, a user opens an interactive datasheet. The interactive datasheet may contain information regarding a product, a machine component, a material, a subsystem, an integrated circuit, or a software product. The datasheet may be a new datasheet that the user found, for example, based on a search or based on a recommendation. Alternatively, the interactive datasheet is an interactive datasheet that has been previously saved. A user may view the interactive datasheet on a website, for example hosted by a vendor or a manufacturer of the product. The user may utilize the interactive datasheet to perform a design using the product.

In the block 104, the user manipulates the interactive datasheet. The interactive datasheet may have multiple sections, for example 2, 3, 4, or more sections, containing different information that a user can view simultaneously. A user may cycle through different views with different sections to see the information in a single screen. In an embodiment, a user utilizes the product in a particular design, and the characteristics illustrated in the datasheet are adjusted based on the characteristics of the particular design indicated by the user. The interactive datasheet may walk the user through the design process in a step-by-step manner, updating the product characteristics throughout the design process. The user may validate a design using the product, obtaining updated technical information in response to user inputs. The interactive datasheet guides the user through the design process, providing real time warnings, suggestions, and error analysis. The interactive datasheet may display frequently asked questions and corresponding answers that are updated based on the product design. The datasheet updates pin specific information triggered by the user hovering a curser over a pin or by the user clicking on a pin. The user may view a design report based on calculations updated with the particular design.

In the block 106, an output is produced based on the interactive datasheet manipulated in the block 104. This may, for example, be triggered by one or more indications from the user. The user may export a datasheet that has been updated based on the design process. The datasheet may be stored in memory of a device of the user, transmitted electronically, for example using e-mail, stored electronically at a third location, faxed, or printed as a hard copy. The datasheet may be stored or exported in the format of a pdf file, or in another file type. Additionally, or alternatively, the datasheet may be stored for later access as an interactive datasheet. The user may ask a technical question or submit a validation request. The user may receive a response either in real time or at a later time, for example when again accessing the interactive datasheet at a later time. In an embodiment, the user may receive an alert, for example in the form of an e-mail or a text, when there is an available message for the user, such as an answer to a question.

Figure 2:
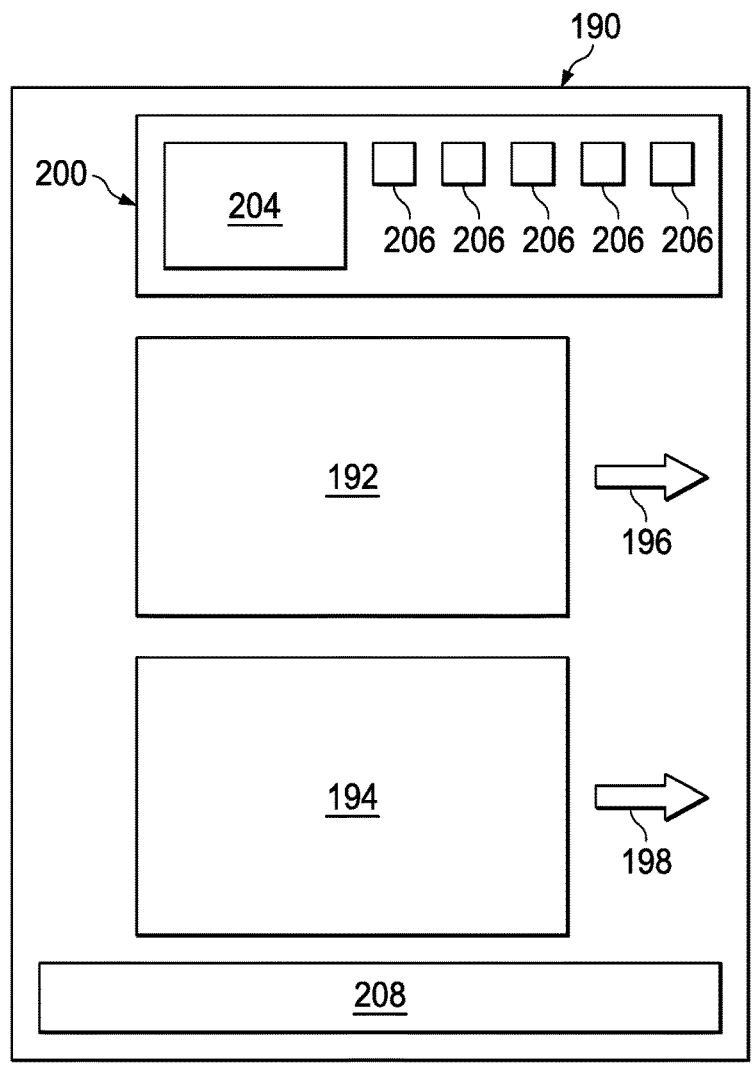
FIG. 2 illustrates an embodiment display for an interactive datasheet.

FIG. 2 illustrates an embodiment display 190 for an interactive datasheet. The display 190 includes the section 192 with the corresponding selector 196, the section 194 with the corresponding selector 198, the footer 208, and the header 200. A user may adjust the information displayed in the sections 192 and 194 using the corresponding selectors 196 and 198, respectively, to view the desired information simultaneously. The sections 192 and 194 may depict one or more of a simplified schematic, features and description, pinout and package options, performance characteristics, ratings and electrical characteristics, applicant and implementation information, a functional block diagram, a printed circuit board (PCB) design, and other information, such as other information contained in a traditional datasheet, which may be updated based on a particular design of a user.

The footer 208 may contain information of general interest, such as safety information, product limitations, other warnings, and website information. Also, the header 200 may include the header information 204 and the buttons 206. The header information 204 may include general information, such as a logo of a supplier of producer, a product number, and a product name. The buttons 206 allow the user to receive inputs and produce outputs, for example to view messages, buy the product, send a support message, request validation, save the datasheet, and return to the home view.

Figure 3:
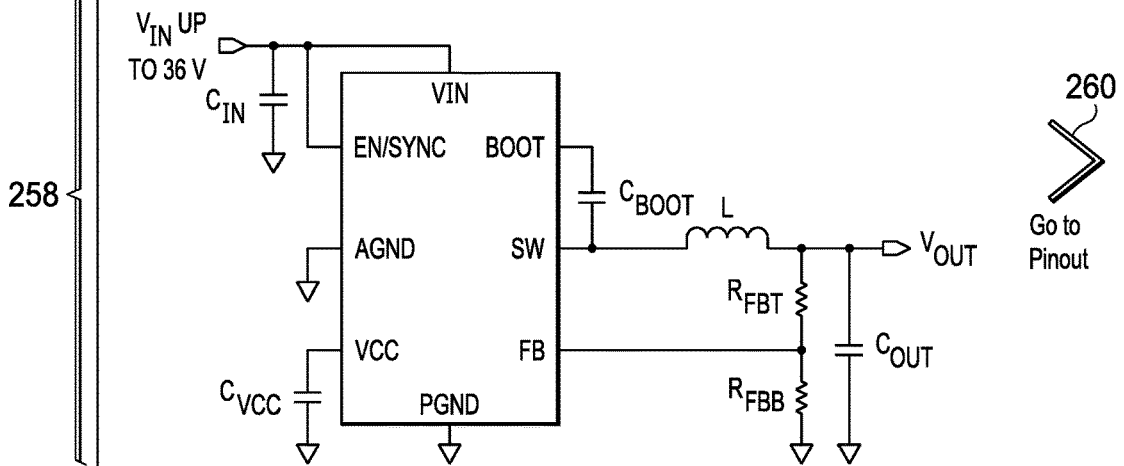
FIG. 3 illustrates another embodiment display for an interactive datasheet.

FIGS. 3-8 illustrates embodiment views of an interactive datasheet for a synchronous step-down converter. FIG. 3 illustrates the embodiment view 240 of an interactive datasheet for the synchronous step-down converter. The view 240 of the interactive datasheet includes general information, such as the logo 242, the part number 244, and the product description 254. The view 240 of the interactive datasheet also includes the footer 267 with warning information and a source website. Additionally, the view 240 of the interactive datasheet displays the simplified schematic 258 and the features and description 262. The button 260 enables the user to transition from viewing the simplified schematic to viewing the pinout in the top portion of the display. Likewise, the button 264 enables the user to transition from viewing the features and description to viewing the ratings and electrical characteristics in the bottom portion of the screen. In other embodiments, the user may select one of multiple options for one or both of the display areas. The illustrated datasheet depicts two sections, but other embodiments may display only a single section, or may display 3, 4, 5, or more sections.

Additionally, the illustrated view 240 of the interactive datasheet includes icons 266, 246, 248, 250, and 252, which enable the user to use various inputs and outputs based on the interactive datasheet. The icon 266 enables the user to view messages, for example support messages, error messages or validations messages. The icon 266 indicates the number of messages, if any, available for the user. In this example, one message is available. The icon 246 enables the user to purchase the product, LMR23630, corresponding to the interactive datasheet. In an embodiment, when the user clicks on the icon 246, a purchasing view becomes available.

The purchasing view displays relevant information, such as cost, shipping options, and availability of the product. The purchasing view, not pictured, may be a portion of the interactive datasheet. Alternatively, when the user clicks on the icon 246, the interactive datasheet links to an existing purchasing website. The user may enter information for purchasing, such as billing information and delivery information. In other examples, the part is automatically purchased based on information the user has previously saved. The user may send a support message using the icon 248. The support message is submitted to support personnel, who reply either in real time or at a later time. Also, the user may save the datasheet using the icon 250. Additionally, the user may return to a home view using the button 252.

Figure 4:
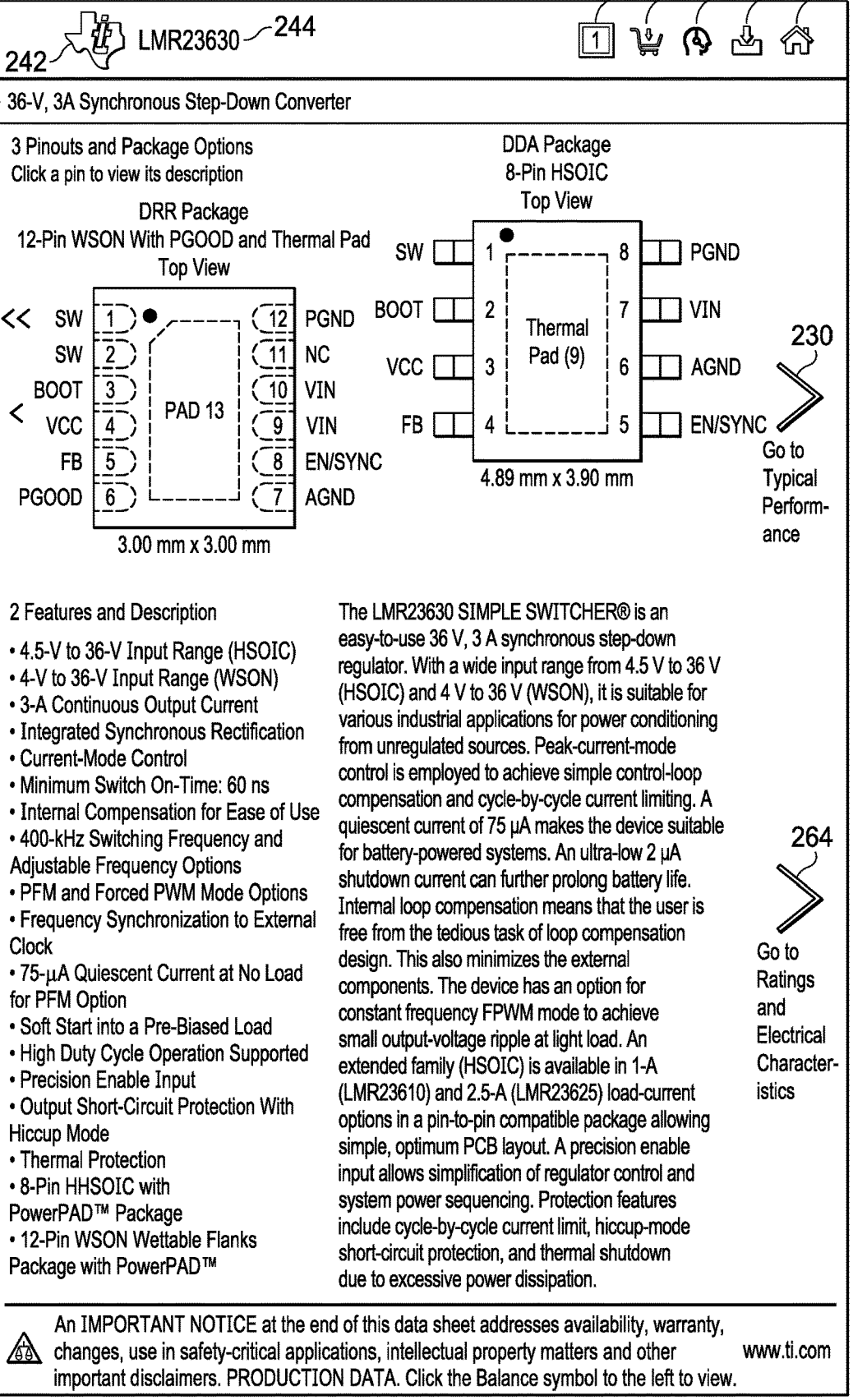
FIG. 4 illustrates an additional embodiment display for an interactive datasheet.

The FIG. 4 illustrates another embodiment view 210 of an interactive datasheet, which is displayed after the user clicks on the button 260 in the view 240. The embodiment view 210 displays the pinouts and package options 228, as well as the features and description 262. The button 230, which corresponds to the pinouts and package options 228, enables the user to view typical performance characteristics. In some embodiments, the performance characteristics are updated based on the particular design implementation.

Figure 5:
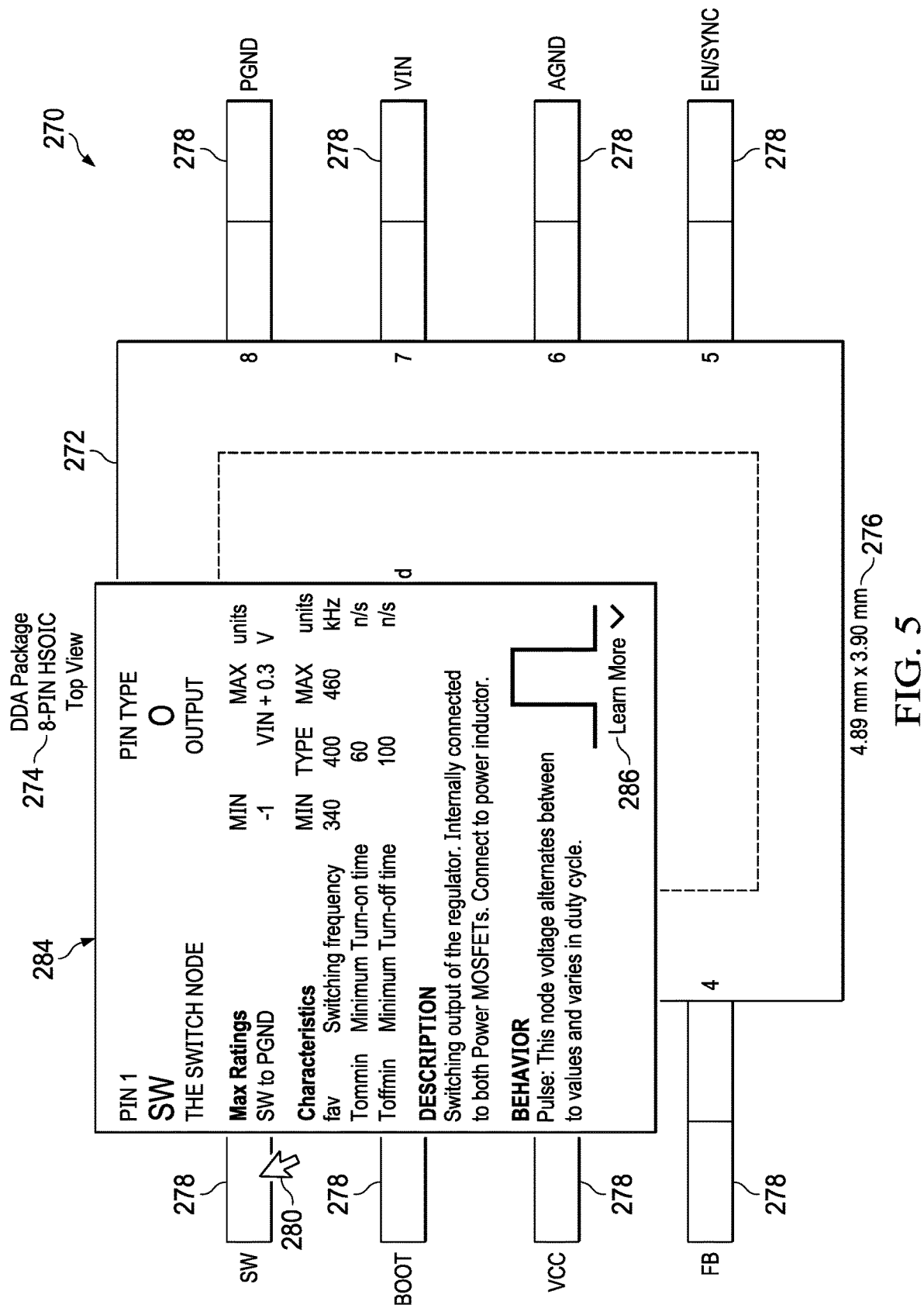
FIG. 5 illustrates an embodiment pinouts and package options view for an interactive datasheet.

The FIG. 5 illustrates the pinout and package options view 270. The pinout and package options view 270 includes the packaging description 274, the package display 272, the package dimensions 276, and the pinouts 278. When the user hovers the cursor 280 over a pinout, for example the pinout 282, the view 284 with additional information becomes visible. For example, the pin name, pin number, pin type, pin rating, pin characteristics, pin description, and pin behavior are visible. Additionally, the icon 286 to learn more is visible. When the user hovers on or clicks on the icon 286, additional information is displayed. For example, a recommended printed circuit board (PCB) layout becomes visible. In an embodiment, the characteristics for the pinouts are calculated at various temperatures.

FIGS. 6A-J illustrate an additional embodiment view 290 for an interactive datasheet. The view 290 becomes displayed when a user clicks on the button 230 and on the button 264 from the view 210. The typical performance characteristics 308 and the ratings and electrical characteristics 312 are illustrated in the view 290. The user may transition from viewing the typical performance characteristics 308 to viewing the application and implementation by clicking the button 310. Additionally, the user may input values or tolerances that are related to a particular design. The interactive datasheet model is updated based on these values. For example, an equation, waveform, or graph is dynamically updated. In one embodiment with a step down converter, design parameters that may be adjusted include the input voltage, output voltage, maximum output current, transient response, output voltage ripple, input voltage ripple, and switching frequency. In other embodiments, other parameters may be varied. Some examples of other parameters include modifying the inductance and visualizing the effect of the inductance change on the output voltage and current ripple, changing the load current and view the effect on the modified load current on power dissipation and thermal performance, and changing the compensation components and viewing the effect of the modified compensation components on a loop response graph. Similarly, the user can transition from viewing the ratings and electrical characteristics 312 to viewing a functional block diagram by clicking the button 314.

Figure 7A:
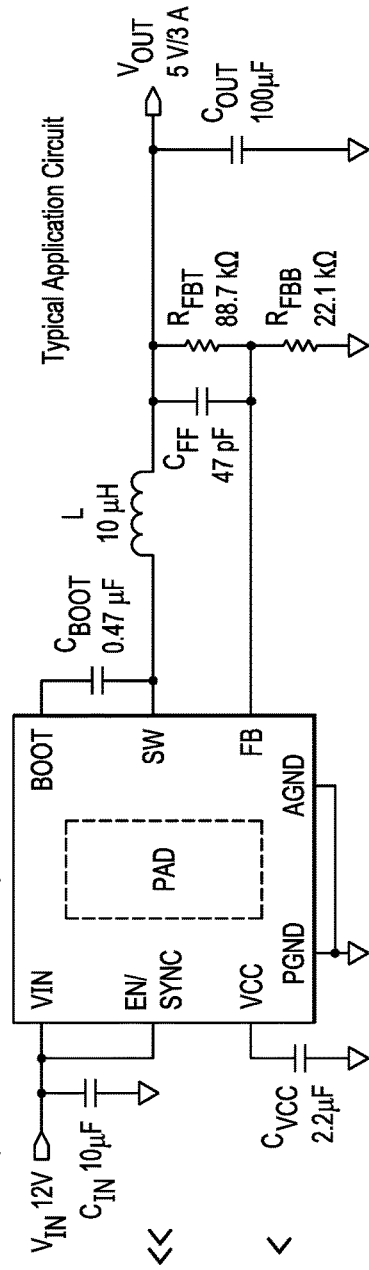
FIGS. 7A-B illustrate an additional embodiment display for an interactive datasheet.
Figure 7B:
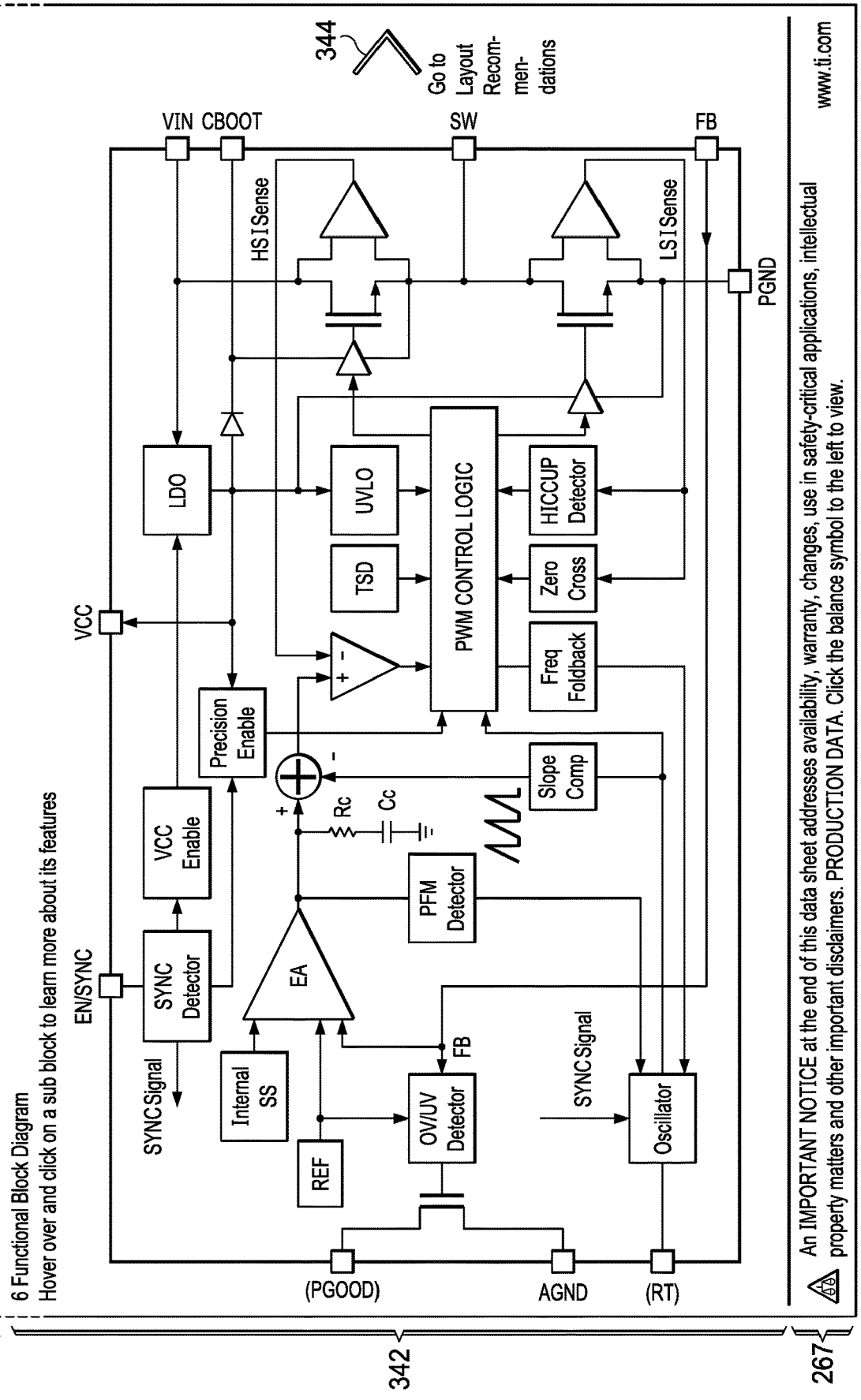

FIGS. 7A-B illustrate an additional embodiment view 320 for the interactive datasheet. The view 320 becomes displayed in response to a user clicking on the button 310 and on the button 314 in the view 290. The application and implementation view 338 and the functional block diagram 342 are displayed in the view 320. The button 340, which corresponds to the application and implementation view 338, enables the user to view the next step in the design process. Additionally, when the user clicks on the button 344 corresponding to the functional block diagram 342, the output device transitions to displaying a layout recommendation for a particular design in the interactive datasheet. When a user hovers over a block, a pop-up with additional information on that block may appear.

Figure 8B:
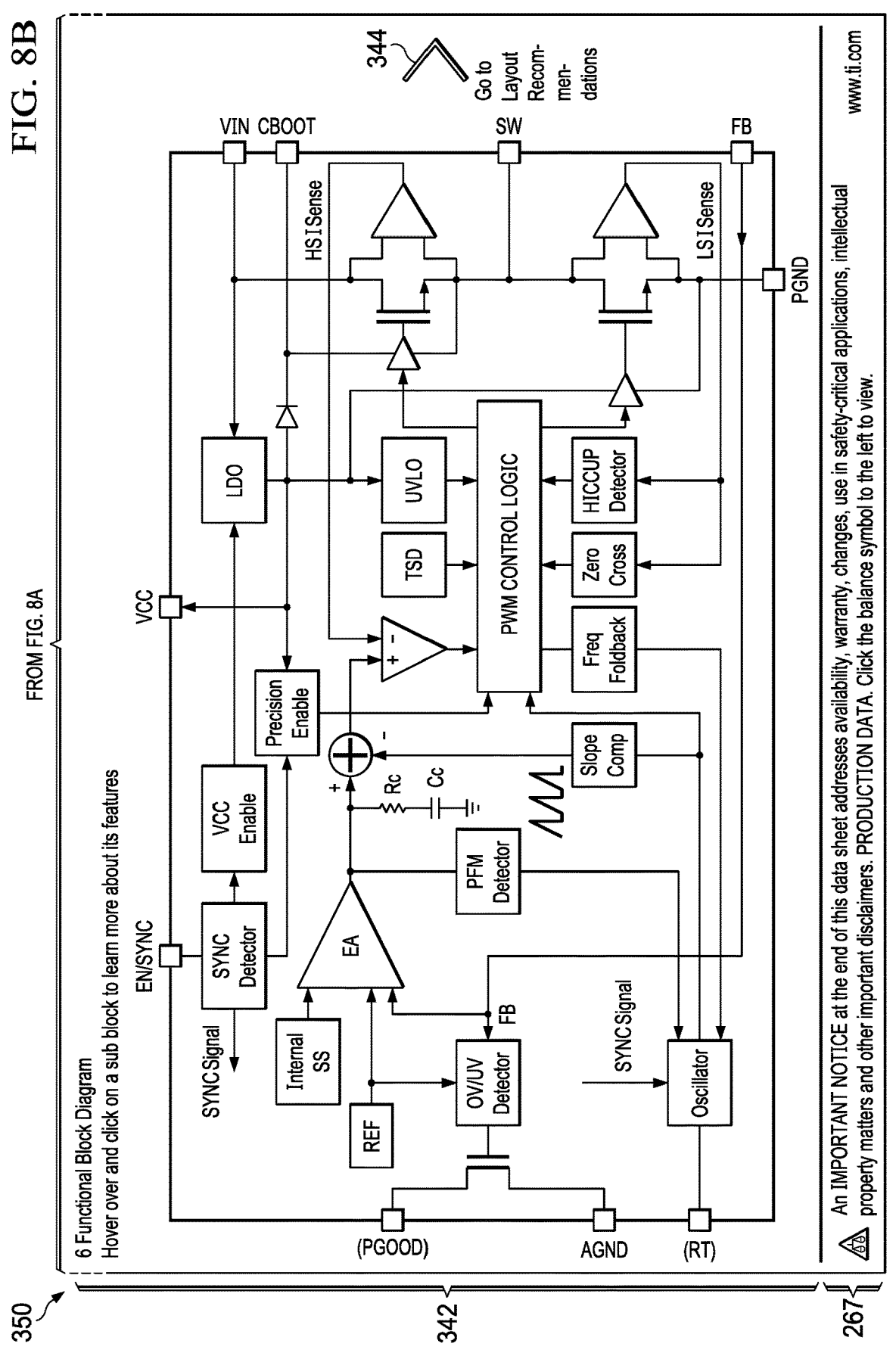

FIGS. 8A-B illustrate the embodiment view 350 for an interactive datasheet. The view 350 becomes visible in response to a user clicking on the button 340 in the view 320. The view 350 depicts the application and implementation 368, which is the next step in application and implementation, after the application and implementation view 338. Additionally, the view 350 includes the button 370, which enables the user to view the next step in the application and implementation.

Figure 9:
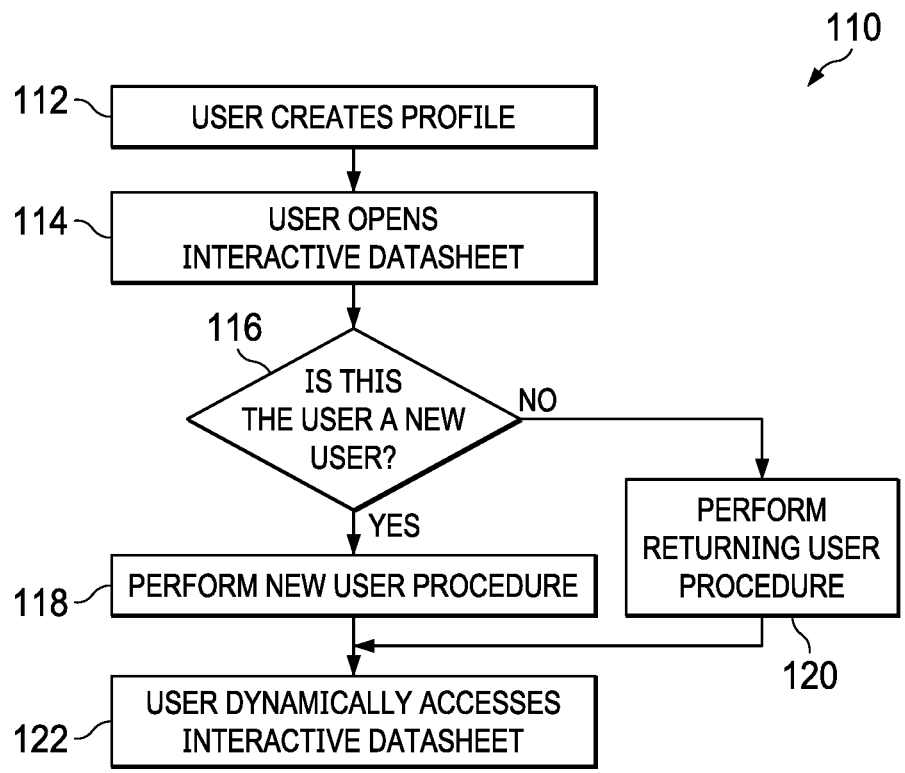
FIG. 9 illustrates a flowchart for an embodiment method of accessing an interactive datasheet.

FIG. 9 illustrates the flowchart 110 for an embodiment method of accessing an interactive datasheet. In the block 112, a user creates a profile in the interactive datasheet system, for example on a web site. In some examples, the user has already created a profile, or does not want to create a profile, and the block 112 is skipped.

In the block 114, the user opens an interactive datasheet. The interactive datasheet may contain all of the information from a traditional datasheet accessible in an interactive and customizable manner.

In the block 116, the system determines whether the user is a new user or a returning user. A new user may have found the interactive datasheet system, for example, based on a search or a recommendation. A returning user may have previously saved a previously saved version of the interactive datasheet. When the user is a new user, the interactive datasheet system proceeds to the block 118 and performs a new user procedure. On the other hand, when the user is a returning user, the interactive datasheet system proceeds to the block 120 and performs the returning user procedure. For both new and returning users, the interactive datasheet system then proceeds to the block 122, and the user dynamically accesses the interactive datasheet.

Figure 10:
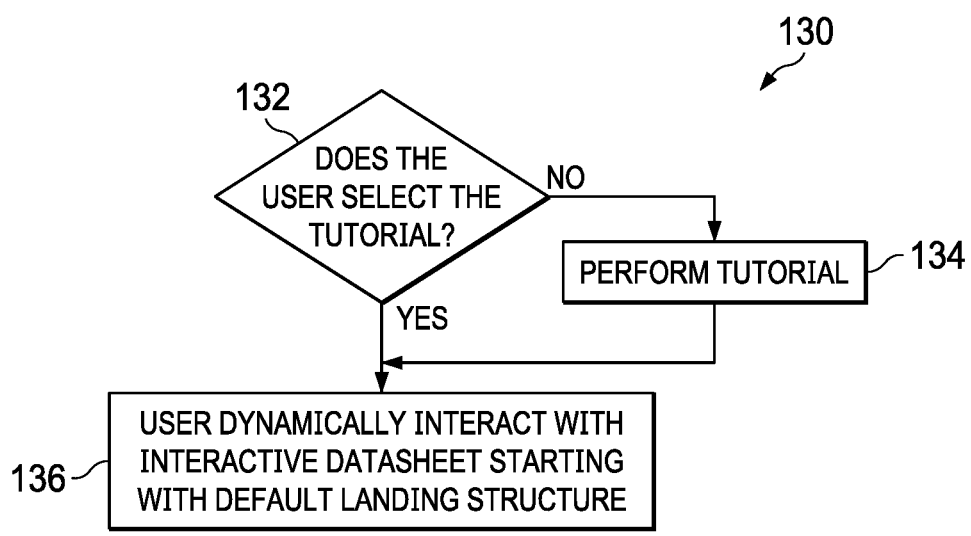
FIG. 10 illustrates a flowchart for an embodiment method of accessing an interactive datasheet by a new user.

FIG. 10 illustrates the flowchart 130 for an embodiment new user procedure for an interactive datasheet. In one embodiment, the flowchart 130 performs the block 118 of the flowchart 110 of FIG. 9. In the block 132, the interactive datasheet system determines whether the user wants to perform a tutorial. The user may indicate that he wants to perform the tutorial or that he does not want to perform the tutorial, for example by selecting a button, a check box, or entering a character in a displayed dialog box. When the user does not select the tutorial, the interactive datasheet system proceeds to the block 136, and the user dynamically interacts with the interactive datasheet, starting with the default landing structure. On the other hand, when the user selects the tutorial, the interactive datasheet system proceeds to the block 134, and the interactive datasheet system walks the user through the interactive datasheet tutorial. Then, the interactive datasheet system proceeds to the block 136, and the user dynamically views the interactive datasheet starting with the default landing structure. The default landing structure may, for example, display two sections, including a simplified schematic section and a features and description section. The default landing structure may display the portions of the interactive datasheet that are most likely to be important for the particular part.

FIG. 11 illustrates the flowchart 140 for an embodiment method for an interactive datasheet. In the block 152, the interactive datasheet system retrieves an interactive datasheet for a product from memory. In one embodiment, the memory is located in the same computing device as the processor retrieving the interactive datasheet. Alternatively, the memory is remote, for example in a database of interactive datasheets. Communications between the processor, the memory, input devices, and output devices may be performed, for example, over the internet. In one embodiment, the input devices and output devices are co-located with a processor, and another processor is collocated with the memory. In another embodiment, memory is collocated with both processors.

In the block 142, the user manipulates the interactive datasheet. In one embodiment, the user independently manipulates separate sections of the interactive datasheet. There may be 1, 2, 3, 4, or more sections displayed in the interactive datasheet, that the user can simultaneously view. The user may click through various sections to view the relevant information. In one embodiment, the view contains two separate sections, each containing a button to transition to another section or to update the section. Additionally, the values of the data may be adjusted based on the information from the user. In one embodiment, an integrated circuit pinout display for the product is displayed, and the user may view details of the characteristics of one or more pinouts based on an action on a pinout by the user, for example by clicking on the pinout or hovering the curser over the pinout. The pinout characteristic may include the pin name, pin number, pin type, pin rating, pin description, pin behavior, or other pin characteristics. In another example, the user may view a PCB layout corresponding to the integrated circuit. In an embodiment, the interactive datasheet is organized using an HTML architecture with a web interface.

In the block 144, the interactive datasheet system walks the user through the design process in a step-by-step manner. This may be performed, for example in an application and implementation section view. The user walks through the design process in a step by step manner. With the user providing inputs, the interactive datasheets system models the device under the conditions of the design. The interactive datasheet system provides warning or error messages based on the user's design. In one embodiment, warnings and errors are color coded, where green indicates good performance, yellow indicates a potentially problematic performance, and red indicates an error. Additionally, the user may input parameters based on the particular design, and the equations of a system model are dynamically updated based on these parameters. In one embodiment, the user transmits a request for validation or support. In response, the user receives a validation or support response. The validation or support response may indicate an answer to a question or a validation status of a design of the user. The answers may be automatically generated, or they may be generated by a support person. The interactive datasheet system may retrieve and display frequently asked questions and corresponding answers, pulled from support, that are specific to the particular design. When a user asks a question and receives an answer, the question and answer may be added to a list of frequently asked questions. When another user experiences a similar situation, the interactive datasheet system may automatically pull a frequently asked question and answer for display.

In the block 146, the user views fixed variables. These fixed variables may be based on the design from the block 144. In one example, the user may view the values of the fixed variables by hovering the curser over a pin from a pinout and package option view.

In the block 148, the interactive datasheet system outputs the interactive datasheet. The output interactive datasheet is personalized based on the particular design. In one example, the interactive datasheet is stored in memory of the interactive datasheet system. The memory may be collocated with the processor updating the interactive datasheet. Alternatively, the memory is remote. In other examples, the user exports the interactive datasheet. For example, the user downloads the interactive datasheet, for example in pdf form, to his own device, e-mails the interactive datasheet, prints a hard copy of the interactive datasheet, or faxes the interactive datasheet. In one embodiment, the user purchases the product, for example by clicking on an icon. The interactive datasheet system may procure payment and shipping information from the user. Alternatively, the interactive datasheet system uses previously stored payment and shipping information.

In the block 150, the user submits a request. The request may be a support request with a particular question, a validation request, or an order for the part. The user may return to the interactive datasheet system at a later time or a later date to receive the response to the question or validation request.

FIG. 12 illustrates the flowchart 390 for an embodiment method of performing a design process using an interactive datasheet. In one example, the flowchart 390 illustrates details of the block 144 in the flowchart 140 in FIG. 11. In the block 392, the interactive datasheet system displays a view of the interactive datasheet. The view of the interactive datasheet may include two sections which are manipulated independently. In the block 394, the user adjusts the value of one or more characteristics of the product in the interactive datasheet. In one example, the ratings and electrical characteristics section is displayed, and the user adjusts the performance tolerances for the product. In another example, the user indicates particular circumstances for the use of the product, such as a temperature. Then, in the block 396, the interactive datasheet system updates the model of the product based on the adjustments made in the block 394. The interactive datasheet system then proceeds to the block 392, where an updated view of the interactive datasheet is displayed on an output device.

Figure 13:
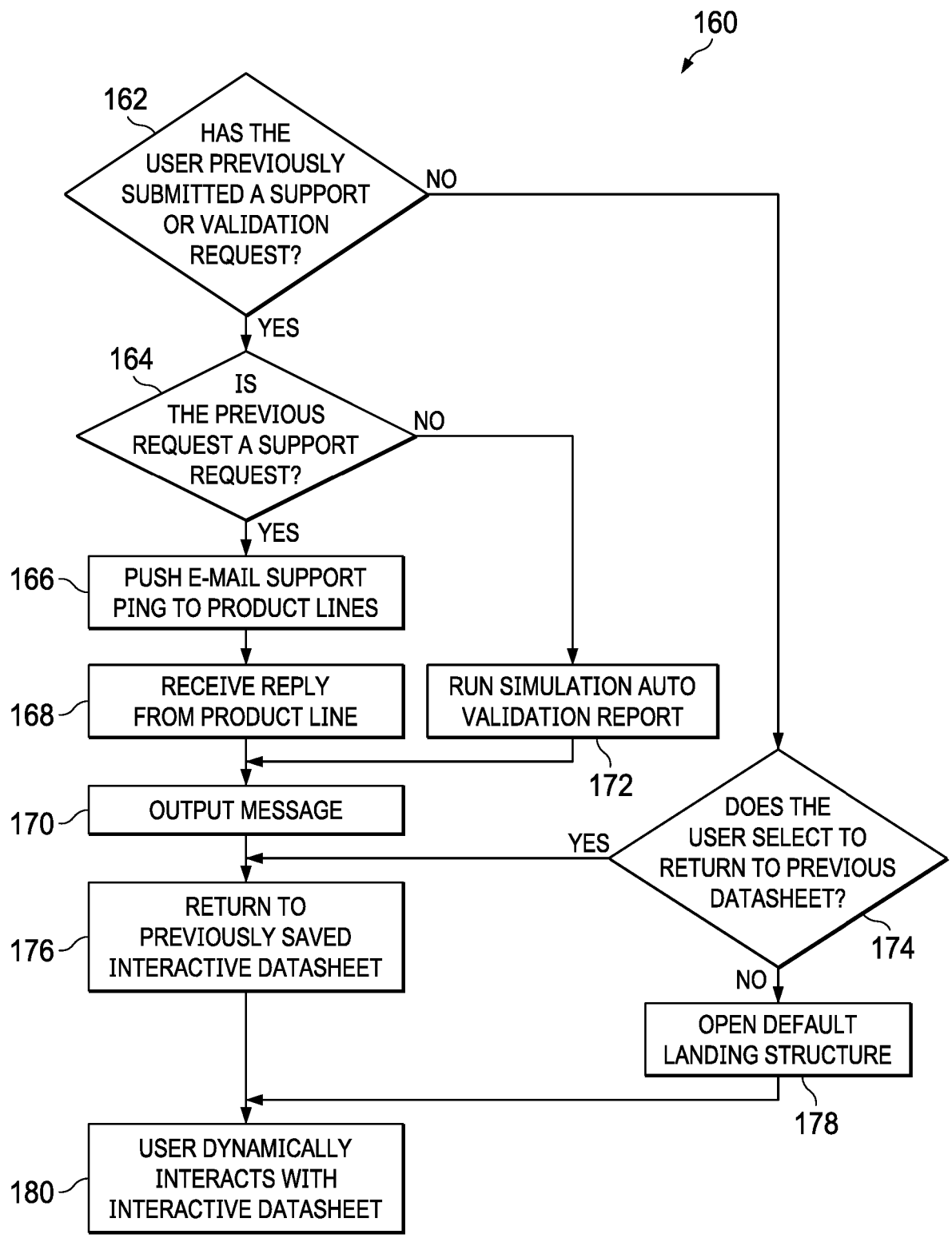
FIG. 13 illustrates a flowchart for an embodiment method of accessing an interactive datasheet by a returning user.

FIG. 13 illustrates the flowchart 160 for an embodiment returning user procedure for an interactive datasheet. In one embodiment, the flowchart 160 is performed in the block 120 in the flowchart 110 in FIG. 9. In the block 162, the interactive datasheet system determines whether the user has previously submitted a support or validation request. When the user has not previously submitted a support or validation request, the interactive datasheet system proceeds to the block 174. On the other hand, when the user has previously submitted a support or validation request, the interactive datasheet system proceeds to the block 164.

In the block 174, the interactive datasheet system determines whether the user wants to return to a previous datasheet. For example, the interactive datasheet system might display a dialog box with options for the user to select. When the user wants to return to the previous datasheet, the interactive datasheet system proceeds to the block 176, and returns to a previously saved interactive datasheet. When the user does not select to return to a previous datasheet, the interactive datasheet system proceeds to the block 178, and uses a default landing structure. After either the block 176 or the block 178, the interactive datasheet system proceeds to the block 180, and the user dynamically interacts with the interactive datasheet.

In the block 164, the interactive datasheet system determines whether the previous request is a support request or a validation request. When the previous request is a validation request, the interactive datasheet system proceeds to the block 172 and runs a simulation auto validation report. Then, the interactive datasheet system proceeds to the block 170, and outputs a message. In one embodiment, the interactive datasheet system displays an indication that a message is available for the user. When the user clicks on the message, the message is displayed. Then, the interactive datasheet system proceeds to the block 176 to return to a previously saved interactive datasheet, which may be retrieved from memory. When the previous request is a support request, the interactive datasheet system proceeds to the block 166, and pushes an e-mail support ping to the product lines. In response, the interactive datasheet system proceeds to the block 168, and receives a reply from the product line. Then, the interactive datasheet system outputs a message in the block 170.

FIG. 14 illustrates a block diagram of an embodiment computing device 380. In at least one example, the computing device 380 is a general purpose computer. In other examples, the computing device 380 is a programmed machine that executes a specific task or set of tasks, such as an application specific integrated circuit (ASIC). In another example, the computing device 380 is a microcontroller with embedded instruction. The computing device 380 includes a memory 382 for storing data and machine-readable instructions. The computing device 380 also includes the processing unit 384 that accesses the memory 382 and executes the machine-readable instructions. The memory 382 is a non-transitory computer-readable medium. In some examples, the memory 382 is volatile memory, such as random access memory, non-volatile memory, such as a hard disk drive, a solid state drive, or flash memory, or a combination thereof.

Additionally, the computing device 380 includes the input/output (I/O) interface 383 for interaction with the I/O device 381. The I/O device 381 may be a monitor, touch-screen display, mouse, keyboard, printer, or other I/O device. The processing unit 384 is implemented as one or more processor cores, for example x86, ARM, digital signal processor (DSP). In an embodiment, the computing device 380 includes a network interface 386 for communicating on the network 388. Embodiments may include multiple computing devices communicating over a network. The network interface 386 may be implemented as a network interface card (NIC). In some examples, the network 388 is implemented as a public network, a private network, or a combination thereof. In some examples, the computing device 380 is implemented in cloud computing.

Although the invention has been described in detail, it should be understood that various changes, substitutions and alterations can be made thereto without departing from the spirit and scope of the invention as defined by the appended claims.

What is claimed is:

1. A method for interactive datasheets, the method comprising:
retrieving, by a processor of a computing device from a memory, an interactive datasheet for a product;
displaying, on an output device of the computing device, a first view of the interactive datasheet for the product, the interactive datasheet comprising a first section and a second section;
performing a new user procedure in response to determining that a user is a new user, based on receiving a first input from an input device;
adjusting, by the processor, in response to receiving by the input device of the computing device from the user, a first value of a characteristic of the product to produce a first adjusted characteristic;
updating, by the processor, a model of the product, based on the first value of the characteristic of the product, to produce an updated interactive datasheet for the product;
updating the first view of the interactive datasheet for the product displayed on the output device, based on the updated interactive datasheet for the product; and
storing, by the processor, the updated interactive datasheet for the product in the memory, in response to receiving using the input device an indication by the user.

2. The method of claim 1, further comprising:
updating, by the processor, from the first view of the interactive datasheet to display on the output device, a second view of the interactive datasheet, in response to receiving using the input device a second indication from the user in the second section, wherein the second view of the interactive datasheet comprises the first section and a third section.

3. The method of claim 1, wherein the first section comprises a simplified schematic, features and description, pinout and package options, performance characteristics, ratings and electrical characteristics, application and implementation information, or a functional block diagram.

4. The method of claim 3, wherein the first view comprises the ratings and electrical characteristics, and wherein the method further comprises:
receiving, by the input device from the user, performance tolerances; and
adjusting the ratings and electrical characteristics displayed on the output device, based on the performance tolerances.

5. The method of claim 3, wherein the first section comprises a pinout display for an integrated circuit for the product, and wherein the method further comprises:
displaying, on the output device, a characteristic of a first pinout of the pinout display for the integrated circuit for the product, in response to receiving, by the input device, an action by the user on the first pinout of the pinout display for the integrated circuit for the product.

6. The method of claim 5, wherein the characteristic of the first pinout of the pinout display for the integrated circuit for the product is a pin name, a pin number, a pin type, a pin rating, a pin description, or a pin behavior.

7. The method of claim 5, further comprising:
displaying, on the output device, a printed circuit board (PCB) layout corresponding to the integrated circuit.

8. The method of claim 1, further comprising:
retrieving, by the processor, a list of frequently asked questions and corresponding answers, based on the updated interactive datasheet for the product; and
displaying, on the output device, the list of frequently asked questions and the corresponding answers.

9. The method of claim 1, further comprising displaying, on the output device, a warning or error message, based on the updated interactive datasheet.

10. The method of claim 1, further comprising exporting, by the processor to a second computing device, the updated interactive datasheet, in response to receiving, by the input device, a second indication by the user.

11. The method of claim 1, further comprising organizing the interactive datasheet utilizing a hypertext markup language (HTML) architecture.

12. The method of claim 1, further comprising:
performing a returning user procedure in response to determining that the user is a returning user based on receiving a second input from the input device.

13. The method of claim 12, wherein performing the returning user procedure comprises:
returning to a previously saved version of the interactive datasheet, in response to receiving, by the input device, a third indication by the user; and
opening a default landing structure of the interactive datasheet, in response to receiving, by the input device, a fourth indication by the user.

14. The method of claim 1, wherein the performing the new user procedure comprises performing a tutorial.

15. The method of claim 1, further comprising:
running a simulation auto validation report on the interactive datasheet.

16. The method of claim 1, wherein the memory is remote from the computing device.

17. A method for interactive datasheets, the method comprising:
retrieving, by a processor of a computing device from a memory, an interactive datasheet for a product;
displaying, on an output device of the computing device, a first view of the interactive datasheet for the product, the interactive datasheet comprising a first section and a second section;
transitioning, by the processor of the computing device, from displaying the first view of the interactive datasheet to displaying, on the output device, a second view of the interactive datasheet, in response to receiving, by an input device, an input from a user in the second section of the first view of the interactive datasheet, wherein the second view of the interactive datasheet comprises the first section and a third section, and wherein the third section replaces the first section;
transmitting, by the processor, a request for validation or support, in response to receiving, by the input device, a validation or support indication by the user;
receiving, by the processor, a validation or support response, in response to transmitting the request for validation or support; and
updating, by the processor, the second view of the interactive datasheet on the output device, based on the validation or support response.

18. The method of claim 17, further comprising:
receiving, by the processor, a second indication of an available message;
displaying, on the output device, the second indication of the available message; and
displaying, on the output device, the available message, in response to receiving, by the input device, a response on the second indication of the available message.

19. The method of claim 17, further comprising:
ordering the product in response to receiving, by the input device, a third indication by the user to purchase the product.

20. A method comprising:
retrieving, by a processor of a computing device from a memory, an interactive datasheet for a product;
displaying, on an output device of the computing device, a first view of the interactive datasheet for the product, the interactive datasheet comprising a first section and a second section;
adjusting, by the processor, in response to receiving by an input device of the computing device from a user, a first value of a characteristic of the product to produce a first adjusted characteristic;
updating, by the processor, a model of the product, based on the first value of the characteristic of the product to produce an updated interactive datasheet for the product;
updating the first view of the interactive datasheet for the product displayed on the output device, based on the updated interactive datasheet for the product;
retrieving, by the processor, a list of frequently asked questions and corresponding answers, based on the updated interactive datasheet for the product; and
displaying, on the output device, the list of frequently asked questions and the corresponding answers.

* * * * *